United States Patent

Okano et al.

[11] Patent Number: 5,853,123
[45] Date of Patent: Dec. 29, 1998

[54] SIGNAL TRANSMISSION/RECEPTION DEVICE OF AIR CONDITIONER

[75] Inventors: Takashi Okano; Kouji Uchida; Kouji Kamafusa; Hisatoshi Kawakami; Masaharu Sogabe; Osamu Tanaka, all of Osaka, Japan

[73] Assignee: Daikin Industries, Ltd., Osaka, Japan

[21] Appl. No.: 809,732

[22] PCT Filed: Oct. 18, 1995

[86] PCT No.: PCT/JP95/02141

§ 371 Date: Apr. 9, 1997

§ 102(e) Date: Apr. 9, 1997

[87] PCT Pub. No.: WO96/12917

PCT Pub. Date: May 2, 1998

[30] Foreign Application Priority Data

Oct. 19, 1994 [JP] Japan ..................................... 6-253138
Dec. 15, 1994 [JP] Japan ..................................... 6-311424

[51] Int. Cl.[6] ........................................................ F24F 11/02
[52] U.S. Cl. ................................. 236/51; 62/175; 165/205
[58] Field of Search .................................... 236/51, 46 R, 236/47; 62/175, 160, 126, 127

[56] References Cited

U.S. PATENT DOCUMENTS

| 4,333,316 | 6/1982 | Stamp, Jr. et al. | ................... 236/51 X |
| 5,279,458 | 1/1994 | DeWolf et al. | ........................ 236/51 X |
| 5,383,336 | 1/1995 | Nishida et al. | ....................... 236/51 X |

FOREIGN PATENT DOCUMENTS 59-210249  11/1984  Japan .

OTHER PUBLICATIONS

English Abstract of Japanese Patent Application Laid Open Gazette No. 6-319171.
English Abstract of Japanese Patent Application Laid Open Gazette No. 6-241543.
English Abstract of Japanese Patent Application Laid Open Gazette No. 4-121547.
English Abstract of Japanese Patent Application Laid Open Gazette No. 4-24460.
English Abstract of Japanese Patent Application Laid Open Gazette No. 4-106359.

*Primary Examiner*—Harry B. Tanner
*Attorney, Agent, or Firm*—Suxbey, Friedman, Leedom & Ferguson, P.C.

[57] ABSTRACT

A signal transmission/reception device of an air conditioner is provided with a plurality of control groups (8A, 8B, . . . ). The control groups (8A, 8B, . . . ) are each composed so that an outdoor control unit (5) and an indoor control unit (6) are connected to each other through a group communication path (7) so as to be capable of signal transmission and reception therebetween. The outdoor control units (5,5, . . . ) are connected to each other through a centralized communication path (10) so as to be capable of signal transmission and reception among them. The respective group communication paths (7) are connected at the respective outdoor control units (5,5, . . . ) to the centralized communication path (10) thereby forming a single signal transmission/reception network (NW). Further, the signal transmission/reception network (NW) is connected to a centralized controller (9) for subjecting the outdoor units (3,3, . . . ) and the indoor units (4,4, . . . ) to centralized control. In addition, relays (28a, 28b) are provided for bringing the group communication path (7) and the centralized communication path (10) into conduction and interruption therebetween.

6 Claims, 9 Drawing Sheets

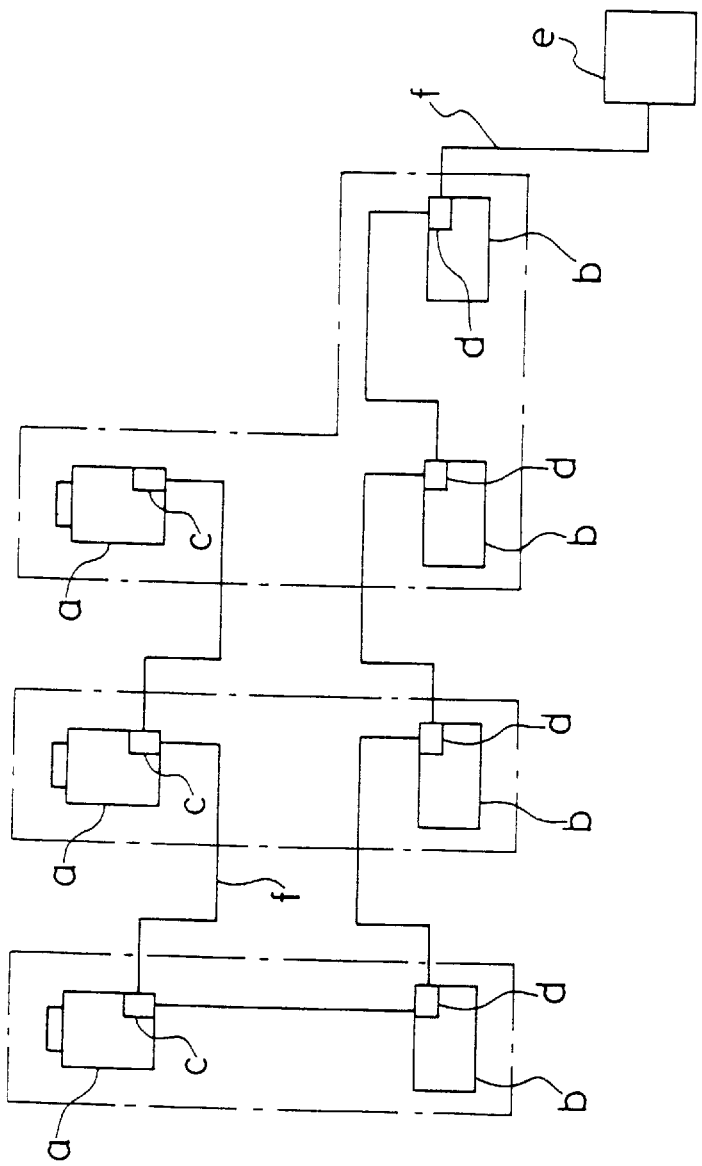

SIGNAL TRANSMISSION/RECEPTION DEVICE OF AIR CONDITIONER

[TECHNICAL FIELD]

This invention relates to a signal transmission/reception device of an air conditioner and particularly relates to improvements of the signal transmission/reception device capable of operation control between a thermal-source-side control unit and a user-side control unit and capable of centralized control through a centralized control unit.

[BACKGROUND ART]

As an example of conventional air conditioners, there is a technique as disclosed in Japanese Patent Application Laid-Open Gazette No. 59-210249, in which an outdoor unit is connected to an indoor unit through refrigerant piping and an outdoor control unit for controlling the outdoor unit is connected to an indoor control unit for controlling the indoor unit through a group communication path. The outdoor control unit and the indoor control unit form one control group in which various kinds of control signals such as an operating signal and a mode signal are transmitted and received.

The control group includes a centralized controller for subjecting the outdoor control unit and the indoor control unit to centralized control. The centralized controller is connected to the outdoor control unit through a centralized communication path so as to be capable of transmission and reception of a centralized control signal therebetween.

A centralized control signal transmitted from the centralized controller is received by a microcomputer of the outdoor control unit so that the outdoor unit is controlled according to the received centralized control signal. Further, the centralized control signal is transmitted from the microcomputer to the indoor control unit so that the indoor unit is controlled according to the centralized control signal. In this way, the outdoor control unit and the indoor control unit are subjected to systematic centralized control.

Problems to be solved

There is a case that a plurality of control groups abovementioned are arranged and the entire air conditioning system composed of the plurality of control groups is subjected to centralized control through a single centralized controller. This case requires a plurality of centralized communication paths for individual connection between the centralized controller and each of the outdoor units of the control groups, which complicates the interconnection of the entire signal transmission/reception system thereby causing the inconvenience of interconnection work. In addition, the risk of incurring an improper interconnection becomes high.

If such an improper interconnection occurs, normal communicating operation cannot be run. Therefore, the above interconnection layout has a problem of lowering the reliability of the entire signal transmission/reception system.

To cope with this, there is a proposed signal transmission/reception system shown in FIG. 9. This signal transmission/reception system is so composed that control units (c,c, ... , d,d, ... ) respectively provided in outdoor units (a,a, ... ) and indoor units (b,b, ... ) and a centralized controller (e) are connected in series through a single communication path (f). According to this signal transmission/reception system, the communication path (f) connecting the control units (c,c, ... , d,d, ... ) and the centralized controller (e) can be reduced in interconnection length and the interconnection layout can be simplified.

In the above-mentioned signal transmission/reception system of the air conditioner, however, when a short circuit or a break occurs at a part of the communication path (f), communication cannot be established at the part. This results in a communication failure between each of the control units (c,c, ... , d,d, ... ) and the centralized controller (e), thereby putting the entire signal transmission/reception system out of function.

The present invention has been made in view of the foregoing problems. An aspect of the present invention has its object of implementing a centralized control of a plurality of control groups through a single centralized control unit without complicating the interconnection of the entire signal transmission/reception system of an air conditioner.

Another aspect of the present invention has its object of avoiding the entire signal transmission/reception system from being out of function in the case that a part of a communication path falls into a communication failure, thereby securing the reliability of the signal transmission/reception system.

[DISCLOSURE OF INVENTION]

Summary of the Invention

In the present invention, a plurality of control groups (8A, 8B, ... ) in each of which a thermal-source-side control unit (5) is connected to a user-side control unit (6) are provided. The thermal-source-side control units (5, 5, ... ) of the control groups (8A, 8B, ... ) are connected to a centralized communication path (10) and group communication paths (7) respectively provided in the control groups (8A, 8B, ... ) are connected to the centralized communication path (10), thereby forming a single signal transmission/reception network (NW). Further, the signal transmission/reception network (NW) is connected to a centralized control unit (9).

As a result, centralized control through the centralized control unit (9) can be implemented and interconnection can be simplified.

Further, when the thermal-source-side control unit (5) receives a signal which should be transmitted and received only in any one of different control groups (8A, 8B, ... ), it detects an improper interconnection.

Furthermore, the group communication path (7) and the centralized control path (10) are interruptably conducted therebetween, which enables signal transmission and reception in the normal control groups (8A, 8B, ... ).

Features of the Invention

More specifically, as shown in FIG. 1, a solution taken in a feature of claim 1 of the invention comprises a plurality of control groups (8A, 8B, ... ) in each of which a thermal-source-side control unit (5) for controlling a thermal-source-side unit (3) and a user-side control unit (6) for controlling a user-side unit (4) are connected to each other through a group communication path (7) so as to be capable of signal transmission and reception therebetween.

The thermal-source-side control units (5,5, ... ) of the control groups (8A, 8B, ... ) are connected to a centralized communication path (10) so that the thermal-source-side control units (5,5, ... ) are connected to each other to implement signal transmission and reception through the centralized communication path (10), and the respective group communication paths (7) are connected at the respective thermal-source-side control units (5,5, ... ) to the centralized communication path (10), thereby forming a single signal transmission/reception network (NW).

In addition, the signal transmission/reception network (NW) is connected to a centralized control unit (9) for subjecting the thermal-source-side units (3,3, . . . ) and the user-side units (4,4, . . . ) to centralized control.

As shown in FIG. 1, a solution taken in a feature of claim 2 of the invention is so composed that in the feature of claim 1 of the invention, communication path interrupting means (28) is provided for bringing conduction and interruption between the group communication path (7) and the centralized communication path (10).

As shown in FIG. 1, a solution taken in a feature of claim 3 of the invention is so composed that in the feature of claim 2 of the invention, the communication path interrupting means (28) executes interruption between the group communication path (7) and the centralized communication path (10) when signal transmission and reception are made only between the thermal-source-side control unit (5) and the user-side control unit (6) in the same control group (8A, 8B, . . . ).

As shown in FIG. 1, a solution taken in a feature of claim 4 of the invention is so composed that in the feature of claim 3 of the invention, the thermal-source-side control unit (5) includes improper interconnection recognizing means (31) for outputting an improper interconnection detecting signal to the group communication path (7) when receiving a signal to be transmitted and received only between the thermal-source-side control unit (5) and the user-side control unit (6) which both belong in any one of the other control groups (8A, 8B, . . . ).

As shown in FIG. 2, a solution taken in a feature of claim 5 of the invention is so composed that in the feature of claim 2 of the invention, the centralized control unit (9) is connected to the centralized communication path (10), communication condition judging means (32) is provided for judging the communication condition of the group communication path (7), and communication path break instructing means (33) is provided for receiving an output of the communication condition judging means (32) and instructing the communication path interrupting means (28), when at least one of the group communication paths (7) falls into a communication failure, to execute interruption between the group communication path (7) in communication failure and the centralized communication path (10).

As shown in FIG. 2, a solution taken in a feature of claim 6 of the invention is so composed that in the feature of claim 2 of the invention, the centralized control unit (9) is connected to the centralized communication path (10), communication condition judging means (32) is provided for judging the communication condition of the centralized communication path (10), and communication path break instructing means (33) is provided for receiving an output of the communication condition judging means (32) and instructing the communication path interrupting means (28), when the centralized communication path (10) falls into a communication failure, to execute interruption between each of all the group communication paths (7,7, . . . ) and the centralized communication path (10).

As shown in FIG. 2, a solution taken in a feature of claim 7 of the invention is so composed that in the feature of claim 2 of the invention, the centralized control unit (9) is connected to the centralized communication path (10), communication condition judging means (32) is provided for judging both the communication conditions of the group communication path (7) and the centralized communication path (10), and communication path break instructing means (33) is provided for receiving an output of the communication condition judging means (32), instructing the communication path interrupting means (28), when at least one of the group communication paths (7) falls into a communication failure, to execute interruption between the group communication path (7) in communication failure and the centralized communication path (10), and instructing the communication path interrupting means (28), when the centralized communication path (10) falls into a communication failure, to execute interruption between each of all the group communication paths (7,7, . . . ) and the centralized communication path (10).

A solution taken in a feature of claim 8 of the invention is so composed that in the feature of any one of claims 2 to 7 of the invention, the communication path interrupting means (28) is composed of relays (28a, 28b).

A solution taken in a feature of claim 9 of the invention is so composed that in the feature of claim 8 of the invention, the centralized communication path (10) is composed of two signal lines (10a, 10b) for transmitting signals and the relays (28a, 28b) execute concurrent conduction or interruption of both the signal lines (10a, 10b).

Operations

In the above feature of claim 1 of the invention, a control signal is transmitted and received between the thermal-source-side control unit (5) and the user-side control unit (6) through the group communication path (7) at the time of air conditioning operation. According to the control signal, the thermal-source-side units (3,3, . . . ) and the user-side units (4,4, . . . ) are each controlled.

Further, the thermal-source-side units (3,3, . . . ) and the user-side units (4,4, . . . ) are each subjected to centralized control in accordance with a centralized control signal transmitted from the centralized control unit (9) through the signal transmission/reception network (NW).

Since the centralized control signal is transmitted to the user-side control unit (6) through the signal transmission/reception network (NW), there is no need for providing a plurality of centralized communication paths which connect the centralized control unit (9) to the individual control groups (8A, 8B, . . . ) In other words, interconnection capable of centralized control can be implemented in a simple manner of connecting the centralized control unit (9) to the group communication path (7) or the centralized communication path (10). This simplifies interconnection as the entire signal transmission/reception system.

Furthermore, since the plurality of group communication paths (7) and the centralized communication path (10) form a single signal transmission/reception network (NW), the connection point of the centralized control unit (9) is subjected to no constraint (See broken lines in FIG. 1).

In the features of claims 2 and 3 of the invention, the communication path interrupting means (28) acts to execute conduction and interruption between the thermal-source-side control unit (5) and the centralized communication path (10). In the case of setting addresses to the thermal-source-side control units (5,5, . . . ) and the user-side control units (6,6, . . . ) respectively at the time of installation, the group communication path (7) can be connected to or disconnected from the centralized communication path (10) by the communication path interrupting means (28). As a result, address setting can be made to each of the thermal-source-side control units (5,5, . . . ) and each of the corresponding user-side control units (6,6, . . . ), by selecting the corresponding unit capable of signal transmission and reception among the thermal-source-side control units (5,5, . . . ) and the user-side control units (6,6, . . . ).

Accordingly, there is no need for manual address setting to each of the thermal-source-side control units (5,5, . . . )

and each of the user-side control units (6,6, . . . ) and address setting can be made through signal transmission and reception between each of the thermal-source-side control units (5,5, . . . ) and corresponding one of the user-side control units (6,6, . . . ).

In the feature of claim 4 of the invention, an improper interconnection is detected with the use of action of the communication path interrupting means (28). In detail, when signal transmission and reception are made only between the thermal-source-side control unit (5) and the user-side control unit (6) in each of the control groups (8A, 8B, . . . ), the communication path interrupting means (28) of the control group (8A, 8B, . . . ) in signal transmission and reception is interrupted so as to provide no signal to the other control groups (8A, 8B, . . . ). In spite of this, if a signal is transmitted to the other control groups (8A, 8B, . . . ), the improper interconnection recognizing means (31) of the thermal-source-side control unit (5) having received the signal recognizes an improper interconnection and outputs an improper interconnection detecting signal to the group communication path (7) of its own group. Thereby, the improper interconnection can be securely detected.

In the feature of claim 5 of the invention, when at least one of the group communication paths (7) falls into a communication failure, the communication path break instructing means (33) causes the communication path interrupting means (28) to execute interruption between the group communication path (7) falling into a communication failure and the centralized communication path (10).

In the feature of claim 6 of the invention, when the centralized communication path (10) falls into a communication failure, the communication path break instructing means (33) causes the communication path interrupting means (28) to interrupt the centralized communication path (10) located between each of all the group communication paths (7,7, . . . ) and the centralized control unit (9).

In the feature of claim 7 of the invention, when either one of the group communication path (7) and the centralized communication path (10) falls into a communication failure, the communication path break instructing means (33) brings the communication path interrupting means (28) into an interrupting state.

Through the above actions, communication is kept on the normal group communication path (7) or the normal centralized communication path (10) so that normal control groups (8A, 8B, . . . ) are continuously operated. As a result, it can be prevented that the entire signal transmission/reception system becomes out of function.

In the feature of claim 8 of the invention, since the communication path interrupting means (28) is relays (28*a*, 28*b*), only one pair of interfaces are required as the connection parts of the thermal-source-side control unit (5) to the centralized communication path (10), which simplifies the configuration. Power loss at the time of power on of the relays (28*a*, 28*b*) is reduced and the configuration is difficult to suffer disturbance due to noise.

In the feature of claim 9 of the invention, signal transmission through the centralized communication path (10) is made by control signals transmitted on two signal lines (10*a*, 10*b*). When the centralized communication path (10) is interrupted by the communication path interrupting means (28), the relays (28*a*, 28*b*) are opened in synchronism with each other. Accordingly, the balance between both the signal lines (10*a*, 10*b*) is kept thereby securing the reliability of the signal transmission/reception system.

Effects of the Invention

According to the feature of claim 1 of the invention, since the thermal-source-side control units (5,5, . . . ) of the control groups (8A, 8B, . . . ) are connected to the centralized communication path (10) and the group communication paths (7) of the control groups (8A, 8B, . . . ) are connected to the centralized communication path (10) thereby forming a single signal transmission/reception network (NW), interconnection capable of centralized control can be implemented in a simple manner of connecting the centralized control unit (9) to the signal transmission/reception network (NW).

As a result, when the plurality of control groups (8A, 8B, . . . ) are subjected to centralized control through one centralized control unit (9), there is no need for a plurality of centralized communication paths which connect the centralized control unit (9) to the individual control groups (8A, 8B, . . . ) as in the conventional case. Accordingly, interconnection in the signal transmission/reception system can be simplified thereby facilitating the interconnection work.

Further, the simplified interconnection reduces the risk of incurring an improper interconnection thereby increasing the reliability of the signal transmission/reception system. In other words, according to the present invention, the plurality of control groups (8A, 8B, . . . ) can be subjected to centralized control through one centralized control unit (9) without complicating the interconnection.

Furthermore, since a single signal transmission/reception network (NW) is formed in such a manner as to conduct the plurality of group communication paths (7) and the centralized communication path (10), the connection point of the centralized control unit (9) is subjected to no constraint. As a result, the freedom of installation position of the centralized control unit (9) can be increased and the connecting work of the centralized control unit (9) can be simplified.

According to the features of claims 2 and 3 of the invention, since the communication path interrupting means (28) is provided between the thermal-source-side control unit (5) and the centralized communication path (10), the group communication path (7) can be connected to or disconnected from the centralized communication path (10) by the communication path interrupting means (28) when addresses are set to the thermal-source-side control units (5,5, . . . ) and the user-side control units (6,6, . . . ) respectively. As a result, address setting can be made to each of the thermal-source-side control units (5,5, . . . ) and each of the user-side control units (6,6, . . . ), by selecting the corresponding unit capable of transmission and reception among the thermal-source-side control units (5,5, . . . ) and the user-side control units (6,6, . . . ).

Accordingly, there is no need for manual address setting by an operator to each of the thermal-source-side control units (5,5, . . . ) and each of the user-side control units (6,6, . . . ) as in the conventional case.

Further, since address setting can be automatically made through signal transmission and reception between each of the thermal-source-side control units (5,5, . . . ) and corresponding one of the user-side control units (6,6, . . . ), auto-address setting as commonly called can be implemented. This enables ease address setting with accuracy in a short time.

According to the feature of claim 4 of the invention, when a signal to be transmitted and received only in each of the control groups (8A, 8B, . . . ) is received by the thermal-source-side control unit (5) of any one of the other control groups (8A, 8B, . . . ), the thermal-source-side control unit (5) recognizes an improper interconnection thereby detecting the improper interconnection with accuracy. This further increases reliability.

According to the features of claims 5 and 7, when the group communication path (7) falls into a communication failure, interruption is provided between the group communication path (7) falling into a communication failure and the centralized communication path (10). According to the features of claims 6 and 7, when the centralized communication path (10) falls into a communication failure, interruption is provided between each of all the group communication paths (7,7, . . . ) and the centralized communication path (10).

Accordingly, communication can be kept on the normal group communication path (7) or the normal centralized communication path (10).

As a result, since the normal control groups (8A, 8B, . . . ) can be continuously operated, it can be prevented that the entire signal transmission/reception system becomes out of function, and risk dispersion as commonly called can be realized. This largely insures the reliability of the signal transmission/reception system.

According to the feature of claim 8 of the invention, since the communication path interrupting means (28) is composed of relays (28a, 28b), only one pair of interfaces are required as the connection parts of the thermal-source-side control unit (5) to the centralized communication path (10), which simplifies the configuration. Further, power loss at the time of power on of the relays (28a, 28b) can be reduced and the configuration is difficult to suffer disturbance due to noise.

According to the feature of claim 9 of the invention, since the centralized communication path (10) is composed of two signal lines (10a, 10b) and the respective relays (28a, 28b) are provided on the respective signal lines (10a, 10b) so as to open and close in synchronism with each other, the balance between both the signal lines (10a, 10b) can be kept thereby securing the reliability of the signal transmission/reception system.

[BRIEF DESCRIPTION OF THE DRAWINGS]

FIG. 9 is a diagram showing a conventional signal transmission/reception system of an air conditioner.

[BEST MODE FOR CARRYING OUT THE INVENTION]

Detailed description is made next about embodiments of the present invention with reference to the drawings.

Embodiment 1

Figure 1:
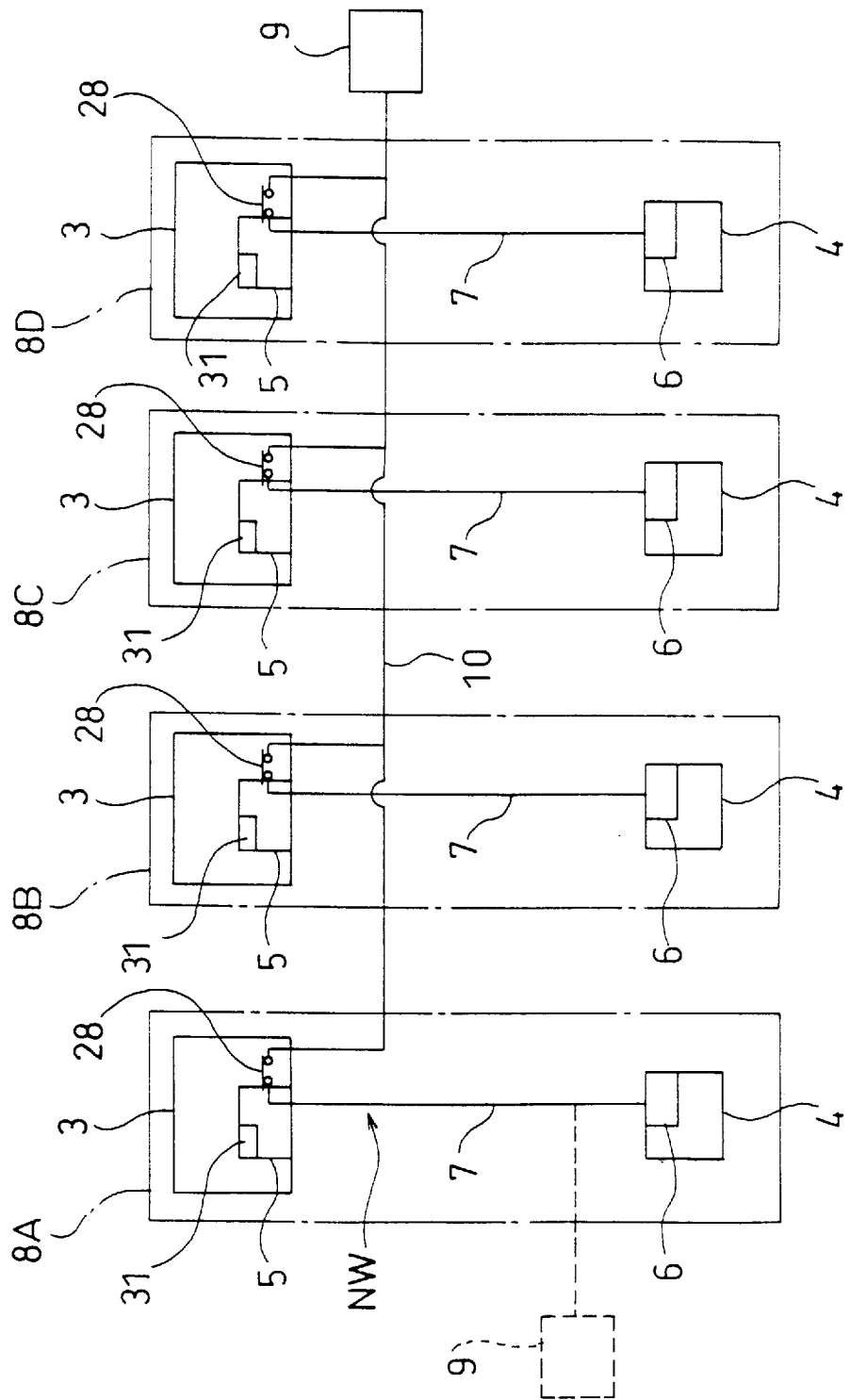
FIG. 1 is a block diagram showing a feature of the present invention.
Figure 2:
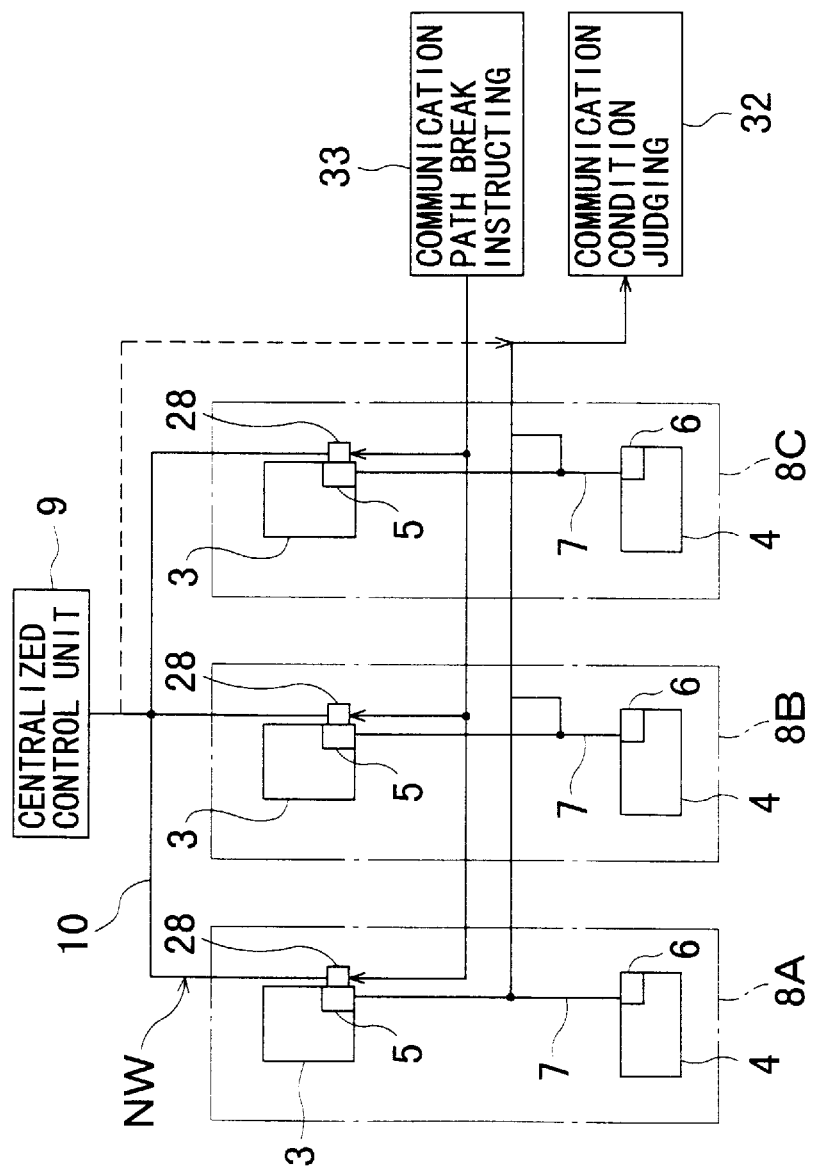
FIG. 2 is a block diagram showing another feature of the present invention.
Figure 3:
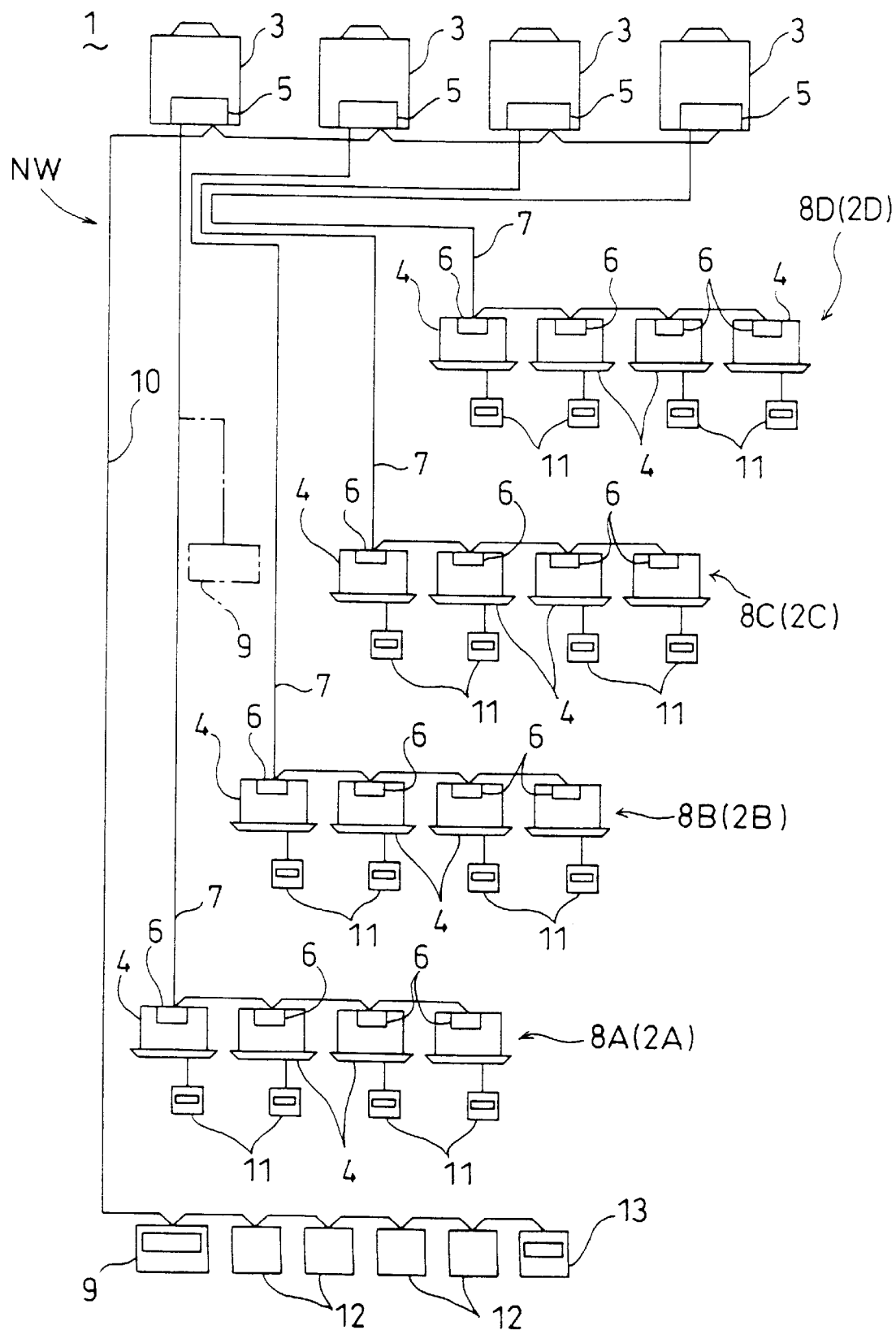
FIG. 3 is a diagram showing a signal transmission/reception system of an air conditioner according to Embodiment 1 of the present invention.

FIG. 3 shows a signal transmission/reception system of an air conditioner (1) of an embodiment according to claims 1 to 4, 8 and 9 of the invention. The air conditioner (1) includes a plurality of refrigerant circulation groups (2A, 2B, 2C, 2D). In FIG. 3, the air conditioner (1) is composed of four refrigerant circulation groups (2A, 2B, 2C, 2D). The four refrigerant circulation groups (2A, 2B, 2C, 2D) are each composed so that four indoor units (4,4, . . . ) are connected in parallel to a single outdoor unit (3) through unshown refrigerant piping.

The outdoor unit (3) is a thermal-source-side unit which includes an unshown outdoor motor-operated expansion valve and an unshown outdoor heat exchanger having a compressor, a four-way selector valve and a fan. The indoor unit (4) is a user-side unit which includes an unshown indoor motor-operated expansion valve and an unshown indoor heat exchanger having a fan. The refrigerant circulation groups (2A, 2B, 2C, 2D) are each composed so that the direction of refrigerant flow is reversible between a cooling operation mode and a heating operation mode.

The outdoor unit (3) includes an outdoor control unit (5) as a thermal-source-side control unit, while the indoor unit (4) includes an indoor control unit (6) as a user-side control unit. The control units (5,6,6, . . . ) included in the same refrigerant circulation group (2A, 2B, 2C, 2D) are connected to each other through a group communication path (7) so as to be capable of transmission and reception of control signals among them, so that four control groups (8A, 8B, 8C, 8D) of the control units are formed in correspondence with the refrigerant circulation groups (2A, 2B, 2C, 2D). In other words, one refrigerant circulation group (2A, 2B, 2C, 2D) forms one control group (8A, 8B, 8C, 8D) and air conditioning is controlled in each control group (8A, 8B, 8C, 8D).

The outdoor control units (5,5, . . . ) are each connected to a centralized controller (9) as a centralized control unit through a centralized communication path (10). In detail, the outdoor control units (5,5, . . . ) are each connected to the centralized communication path (10) so that the outdoor control units (5,5, . . . ) are connected to each other so as to be capable of signal transmission and reception through the centralized communication path (10), and the respective group communication paths (7) are connected at the respective outdoor control units (5,5, . . . ) to the centralized communication path (10). Thus, a single signal transmission/reception network (NW) is formed.

A control signal from the centralized controller (9) is transmitted to each of the outdoor control units (5,5, . . . ) and each of the indoor control units (6,6, . . . ) through the centralized communication path (10) and each of the group communication paths (7,7, . . . ), so that the outdoor units (3,3, . . . ) and the indoor units (4,4, . . . ) are subjected to systematic centralized control.

Each of the indoor units (4,4, . . . ) is connected to a remote controller (11). Control signals such as a temperature setting signal are transmitted and received between the remote controller (11) and the indoor control unit (6) so that the indoor units (4,4, . . . ) are individually controlled by the corresponding remote controllers (11).

The centralized communication path (10) is connected to ON/OFF controllers (12,12, . . . ) and a schedule timer (13). The ON/OFF controllers (12,12, . . . ) transmit control signals such as a start signal and a stop signal to the plurality of indoor units (4,4, . . . ) divided into some groups to subject the indoor units (4,4, . . . ) to batch control in each group.

The schedule timer (13) sets an operation start time and an operation stop time, for example, in weeks, to each of the indoor units (4,4, . . . ).

Next, description is made about respective configurations of circuits of the control units (5,6,9) which transmit and receive control signals.

For the transmission mode among the outdoor control unit (5), the indoor control unit (6) and the centralized controller (9), the AMI (Alternate Mark Inversion) communication mode and the balanced transmission mode are adopted, wherein half-duplex signal transmission is made at preset polarities.

Figure 4:
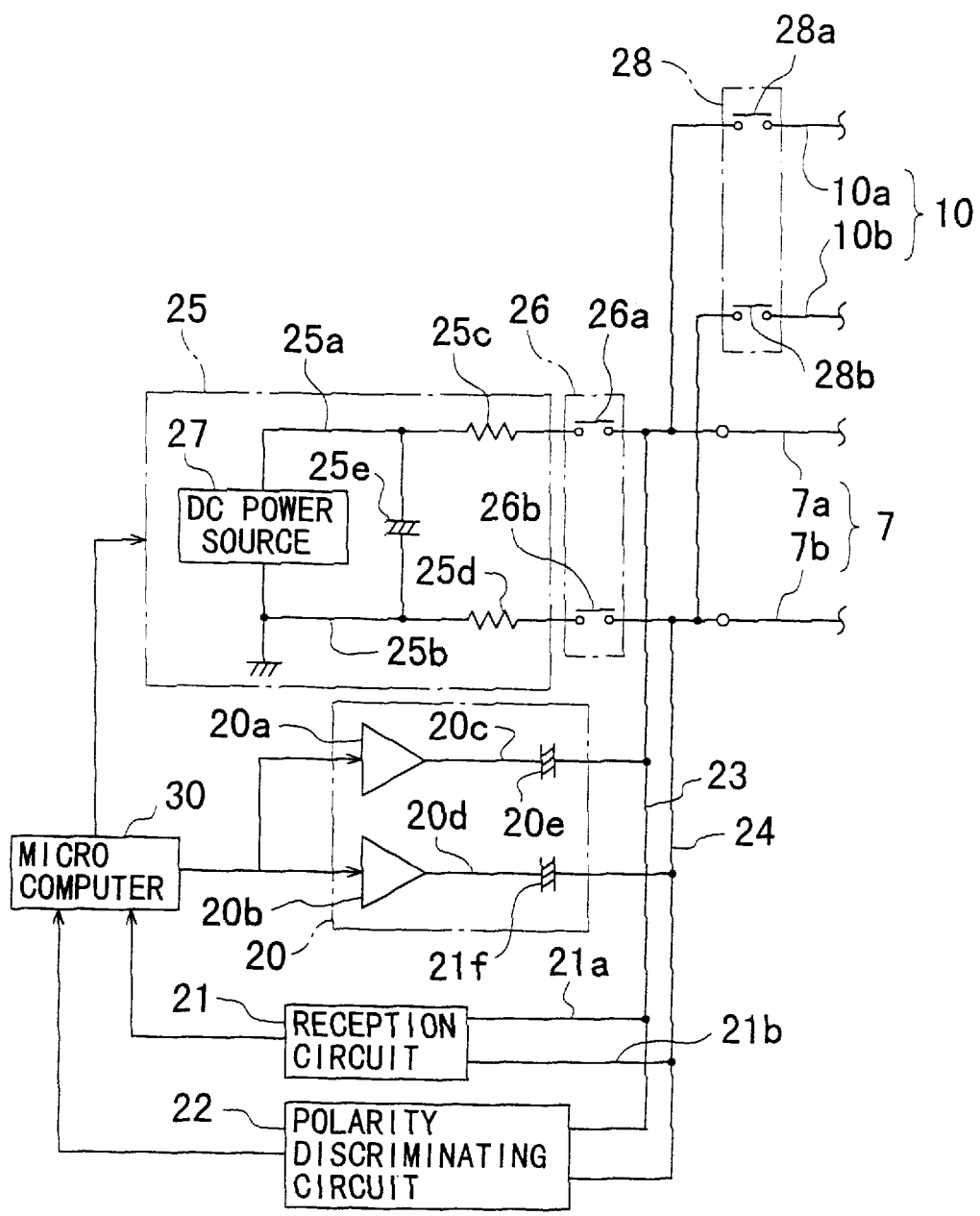
FIG. 4 is block circuit diagram of an outdoor control unit.

As shown in FIG. 4, the outdoor control unit (5) includes a transmission circuit (20), a reception circuit (21) and a polarity discriminating circuit (22). The transmission circuit (20), the reception circuit (21) and the polarity discriminating circuit (20) are connected to a microcomputer (30). The indoor control unit (6) and the centralized controller (9) each include a transmission circuit (20), a reception circuit (21) and a polarity discriminating circuit (22) which are similar in configuration to those of the outdoor control unit (5). Here, taking the outdoor control unit (5) as an example, respective configurations of circuits are described.

The group communication path (7) and the centralized communication path (10) are each formed of a positive signal line (7a,10a) and a negative signal line (7b,10b).

The transmission circuit (20) transmits a control signal to the group communication path (7) and the centralized communication path (10) in accordance with an output signal from the microcomputer (30) and includes two drivers (20a, 20b). The respective drivers (20a, 20b) are connected to the respective common signal lines (23, 24), which are connected to the positive signal lines (7a,10a) of the group communication path (7) and the centralized communication path (10) and the negative signal lines (7b,10b) thereof respectively, through respective coupled signal lines (20c, 20d). The coupled signal lines (20c, 20d) are connected to capacitors (20e, 20f) for removing direct current portions, respectively.

The reception circuit (21) is connected to the common signal lines (23, 24) through the coupled signal lines (21a, 21b) respectively, receives control signals of the group communication path (7) and the centralized communication path (10) and outputs the control signals to the microcomputer (30).

The polarity discriminating circuit (22) is connected to the positive signal lines (7a,10a) of the group communication path (7) and the centralized communication path (10) and the negative signal lines (7b,10b) thereof through the common signal lines (23, 24) respectively, and discriminates each polarity of the group communication path (7) and the centralized communication path (10). When the polarity discriminating circuit (22) discriminates a different polarity, the drivers (20a, 20b) of the transmission circuit (20) can invert the polarity of a control signal to be transmitted.

The group communication path (7) and the centralized communication path (10) are connected to a DC superposition circuit (25) through a first open/close circuit (26). The DC superposition circuit (25) includes a DC power source (27) connected to the positive signal lines (7a,10a) of the group communication path (7) and the centralized communication path (10) and the negative signal lines (7b,10b) thereof through power supply lines (25a, 25b), respectively. The DC power source (27) applies a set DC voltage, for example, +15 V DC, to both the communication paths (7, 10).

The first open/close circuit (26) includes two relay switches (26a, 26b) provided on the power supply lines (25a, 25b) respectively, and provides conduction and interruption between the DC superposition circuit (25) and each of the communication paths (7, 10) through closing and opening of both the relay switches (26a, 26b).

Both the relay switches (26a, 26b) each open and close under the control of the microcomputer (30). When the relay switches (26a, 26b) of the preset outdoor control unit (5) become closed states, the DC superposition circuit (25) is conducted to the communication paths (7, 10) so that a DC voltage is superposed on the respective communication paths (7, 10). For example, the DC superposition circuit (25) of the outdoor control unit (5) set at address "A" applies a DC voltage to the communication paths (7, 10) and the relay switches (26a, 26b) of the other outdoor control units (5) become open states.

The power supply lines (25a, 25b) are provided on their respective ways with terminal resistances (25c, 25d). A capacitor (25e) is connected between both the power supply lines (25a, 25b) so as to be parallel with the DC power source (27). The terminal resistances (25c, 25d) restrict the occurrence of distortion of a signal wave form in each of the communication paths (7, 10). The capacitor (25e) holds the impedances of the communication paths (7, 10) at set low values.

As one of features of the present invention, the centralized communication path (10) is provided with a second open/close circuit (28) as a communication path interrupting means. The second open/close circuit (28) includes two relay switches (28a, 28b) provided on the centralized communication path (10), and opens and closes both the relay switches (28a, 28b) under the control of the microcomputer (30), whereby conduction and interruption are provided between the centralized communication path (10) and each of the circuits (20, 21, 22) such as the transmission circuit (20) and conduction and interruption are provided between the centralized communication path (10) and the group communication path (7). Both the relay switches (28a, 28b) are closed under conditions of usual signal transmission, and are operated to open and close under the control of the microcomputer (30) when an address is set to each of the outdoor units (3,3, . . . ) and each of the indoor units (4,4, . . . ).

Address Setting

Next, address setting at the time of installation of the air conditioner (1) is described.

In the address setting, sequentially executed are a power supply master unit determining operation of determining one of the outdoor units (3,3, . . . ) to an outdoor unit for supplying power for signal transmission (hereinafter, referred to as a power supply master unit), an address-for-control setting operation of setting respective address numbers to the respective units (3, 3, . . . , 4, 4, . . . ) and a group member address recognizing operation of causing each of the units (3,4,4, . . . ) to recognize the units (3,4,4, . . . ) belonging to the same control group (8A, 8B, 8C, 8D). The respective operations are described below.

Power Supply Master Unit Determining Operation

First, the power supply master unit determining operation is described.

The relay switches (28a, 28b) of the second open/close circuit (28) are turned ON to enable signal transmission and reception among the outdoor control units (5,5, . . . ) through the centralized communication path (10). In this state, respective manufacturing serial numbers given to the respective outdoor units (3,3, . . . ) at the time of manufacturing are transmitted and received among the outdoor control units (5,5, . . . ) and a power supply master unit is determined through the competition of the serial numbers by the CSMA/CD (carrier sense multiple access with collision detect) method. As a result, the outdoor unit (3) having the smallest serial number is determined to the power supply master unit.

In detail, when the outdoor unit (3) receives a serial number smaller than its own serial number, it stops the transmission of its own serial number from the time and becomes the outdoor unit for receiving power from the power supply master unit (hereinafter, referred to as a power supply slave unit). Through the repetition of the above action, only one outdoor unit (3) which finally wins the competition and has the smallest serial number becomes the power supply master unit, and the other outdoor units (3,3, . . . ) become power supply slave units. Under conditions of usual signal transmission, the power supply master unit thus determined turns the relay switches (26a, 26b) of the first open/close circuit (26) to the ON position at any time and applies a DC voltage from the DC superposition circuit (25) to each of the communication paths (7, 10).

In addition to the above power supply master unit determining operation through the competition of the serial numbers, forced master unit setting buttons may be provided on print boards of the outdoor control units (5,5, . . . ), respectively. At the push of the setting button by an operator, the outdoor unit (3) is forcefully set to a power supply master unit. In this case, a master unit determining operation code (hereinafter, referred to as a master unit determining OPC) is transmitted from the power supply master unit to each of the outdoor control units (5,5, . . . ), and the outdoor units (3,3, . . . ) having received the master unit determining OPC forcefully become power supply slave units.

In addition to the setting of the outdoor unit (3) to the power supply master unit, the DC superposition circuit (25) may be provided in the centralized controller (9) so that the centralized controller (9) has the function of supplying power. Also in this case, a master unit determining OPC is transmitted from the centralized controller (9) to each of the outdoor control units (5,5, . . . ).

Address-for-Control Setting Operation

Next, the address-for-control setting operation is described.

In this operation, one of the outdoor units (3,3, . . . ) is determined to an outdoor unit for assigning respective address numbers for control to the respective units (3,3, . . . , 4,4, . . . ) (hereinafter, referred to as an address setting master unit). The address setting master unit is determined in the same manner as in the above-mentioned power supply master unit determining operation through the competition of the serial numbers. The address setting master unit thus determined sets different address numbers for control to all the indoor units (4,4, . . . ) and all the outdoor units (3,3, . . . ).

Figure 5:
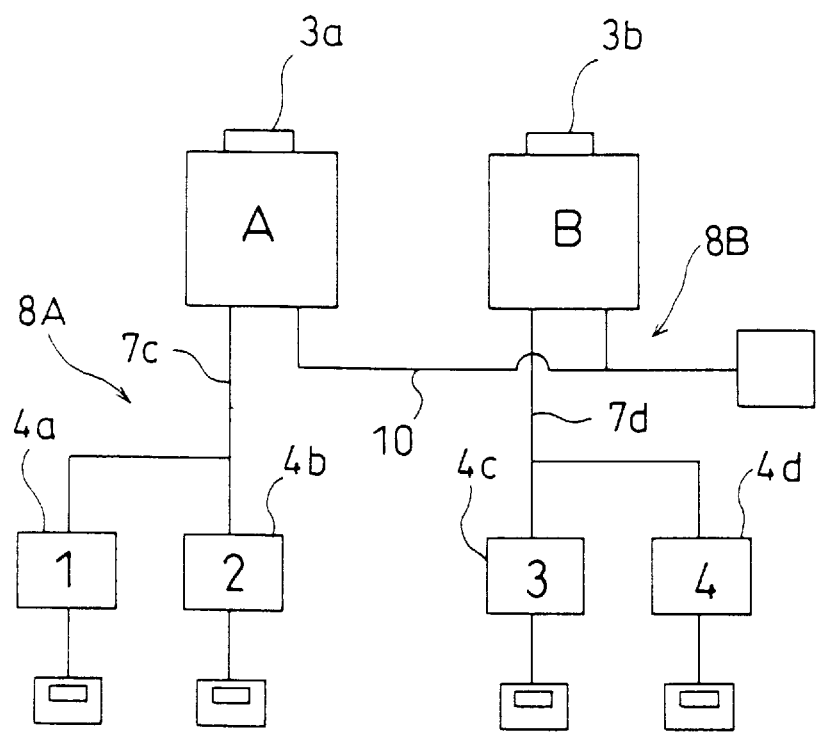
FIG. 5 is a diagram showing a system for illustration of address setting.

The address-for-control setting operation is described in detail with reference to FIG. 5. In FIG. 5, only two control groups (8A, 8B) are shown for ease of understanding.

In FIG. 5, through the competition of the serial numbers with the use of the centralized communication path (10), a left-side outdoor unit (3a) out of two outdoor units (3a, 3b) is determined to the address setting master unit. In this case, the address setting master unit (3a) first assigns respective address numbers for indoor unit control to respective indoor units (4a, 4b, 4c, 4d). In FIG. 5, "1 to 4" are assigned as address numbers for simplicity.

Thereafter, the address setting master unit (3a) assigns respective address numbers for outdoor unit control to the respective outdoor units (3a, 3b) including itself. In FIG. 5, "A, B" are assigned as address numbers for simplicity.

Through the above-mentioned operation, different address numbers for control are set to all the indoor units (4a, 4b, 4c, 4d) and all the outdoor units (3a, 3b).

Group Member Address Recognizing Operation

Next, description is made about the group member address recognizing operation of recognizing controllable addresses in each control group (8A, 8B, . . . ).

First, the relay switches (28a, 28b) of the second open/close circuit (28) are turned OFF, so that signal transmission and reception among the outdoor control units (5,5, . . . ) through the centralized communication path (10) are disabled while signal transmission and reception are enabled only between the outdoor control unit (5) and each of the indoor control units (6,6, . . . ) through the group communication path (7). In this state, signal transmission and reception through the group communication path (7) allow the outdoor control unit (5) and the indoor control units (6,6, . . . ) to each recognize the address number of the corresponding unit connected thereto.

The above recognizing operation is described in detail with reference to FIG. 5.

The outdoor unit (3a) of address number "A" transmits an address signal to the indoor units (4a, 4b) having respective address numbers "1" and "2" through the group communication path (7) connecting the outdoor unit (3a) to each of the indoor units (4a, 4b). Based on the transmitted address signal, the indoor units (4a, 4b) each recognize that the address number of the indoor unit (3a) connected thereto is "A".

In other words, the indoor unit (4a) of address number "1" recognizes, in addition to the self address number "1", the address number "A" of the outdoor unit (3a) connected thereto. Similarly, the indoor unit (4b) of address number "2" recognizes, in addition to the self address number "2", the address number "A" of the outdoor unit (3a) connected thereto.

Thereafter, the outdoor unit (3a) of address number "A" reads address data of each of the indoor control units (4a, 4b) connected thereto through the group communication path (7) to recognize that the indoor units (4a, 4b) having respective address numbers "1" and "2" are connected thereto.

The same action is also executed for the other control group (8B). That is, the same action is executed for the control group (8B) in which the outdoor unit (3b) of address number "B" is connected to the indoor units (4c, 4d) having respective address numbers "3" and "4", so that the units each recognize the address number of the corresponding unit.

In the above group member address recognizing operation, each unit recognizes the address number of the corresponding unit in each control group (8A, 8B, . . . ) with the use of addresses for control. However, addresses for group of different kind may be set in place of the addresses for control and each unit may recognize the address number of the unit connected thereto in each control group (8A, 8B, . . . ) with the use of the addresses for group of different kind.

Signal Transmission and Reception

Through such a series of operations, address setting is completed. Then, at the start of operation of the air conditioner (1), the power supply master unit turns the relay switches (26a, 26b) of the first open/close circuit (26) to the ON position. Thereby, the DC superposition circuit (25) and each of the communication paths (7, 10) are brought into conduction therebetween so that a DC voltage is superposed on each of the communication paths (7, 10).

All the power supply slave units each turn the relay switches (26a, 26b) of their first open/close circuits (26) to the OFF position.

All the outdoor control units (5,5, . . . ) each turn the relay switches (28a, 28b) of their second open/close circuits (28) to the ON position. Thereby, the centralized communication path (10) and the group communication path (7) are brought into conduction therebetween so as to be capable of centralized control through the centralized controller (9). In this manner, signal transmission and reception are made in each of the control groups (8A, 8B, . . . ) through the group communication path (7) and signal transmission and reception for centralized control of the entire device are made through the group communication path (7) and the centralized communication path (10), thereby executing air conditioning.

Effects of Signal Transmission and Reception System of Embodiment 1

According to Embodiment 1, the outdoor control units (5,5, . . . ) of the control groups (8A, 8B, . . . ) are each connected to the centralized communication path (10) and the group communication path (7) of each of the control groups (8A, 8B, . . . ) is connected to the centralized communication path (10), thereby forming a single signal transmission/reception network (NW). Thereby, interconnection capable of centralized control can be implemented in a simple manner of connecting the centralized controller (9) to the signal transmission/reception network (NW).

As a result, when a plurality of control groups (8A, 8B, . . . ) are subjected to centralized control through a single centralized controller (9), there is no need for a plurality of centralized communication paths for connecting the centralized controller (9) to the individual control groups (8A, 8B, . . . ) as in the conventional case. This simplifies the interconnection of the signal transmission/reception system thereby facilitating the interconnection work.

Further, the simplified interconnection minimizes the risk of incurring an improper interconnection thereby increasing the reliability of the signal transmission/reception system. In other words, according to the present embodiment, the plurality of control groups (8A, 8B, . . . ) can be subjected to centralized control through the single centralized controller (9) without complicating interconnection.

Furthermore, since there is formed a single signal transmission/reception network (NW) in which the plurality of group communication paths (7) and the centralized communication path (10) are brought into conduction among them, the connection point of the centralized controller (9) is subjected to no constraint. That is, though the above-mentioned centralized controller (9) is connected to the centralized communication path (10), the centralized controller (9) can transmit a centralized control signal to the entire system without the involvement of a microcomputer or the like even if it is connected to the group communication path (7) (See imaginary lines in FIG. 3). As a result, the freedom of the installation position of the centralized controller (9) can be increased and the connecting work of the centralized controller (9) can be simplified.

Further, since the communication path interrupting means (28) is provided between the outdoor control unit (5) and the centralized communication path (10), the group communication path (7) can be connected to and disconnected from the centralized communication path (10) by the communication path interrupting means (28) when addresses are assigned to the outdoor control units (5,5, . . . ) and the indoor control units (6,6, . . . ) respectively. As a result, address setting can be made to the outdoor control units (5,5, . . . ) and the indoor control units (6,6, . . . ) respectively, by selecting the corresponding unit capable of signal transmission and reception among the outdoor control units (5,5, . . . ) and the indoor control units (6,6, . . . ).

Accordingly, there can be no need for manual address setting by an operator to the outdoor control units (5,5, . . . ) and the indoor control units (6,6, . . . ) as in the conventional case.

Furthermore, since address setting can be made automatically through signal transmission and reception between each of the outdoor control units (5,5, . . . ) and corresponding one of the indoor control units (6,6 . . . ), auto-address setting as commonly called can be realized thereby implementing ease address setting with accuracy in a short time.

Since the second open/close circuit (28) is formed of relays (28a, 28b), only one pair of interfaces are required as connection parts of the outdoor control unit (5) to the centralized communication path (10), which simplifies the configuration. Further, power loss at the time of power on of the relays (28a, 28b) can be reduced and the configuration is difficult to suffer disturbance due to noise.

Furthermore, since the centralized communication path (10) is composed of two signal lines (10a, 10b) and the respective relays (28a, 28b) are provided on the respective signal lines (10a, 10b) so as to open and close in synchronism with each other, the balance between both the signal lines (10a, 10b) can be kept thereby securing the reliability of the signal transmission/reception system.

Improper Interconnection Detection

Next, description is made about an improper interconnection detection in the case that an improper interconnection occurs in the above interconnection of the air conditioner (1). Particularly, in the present embodiment, description is made about the detection of an improper interconnection in which the group communication path (7) and the centralized communication path (10) are connected directly to each other without involving the outdoor control unit (5).

Figure 6:
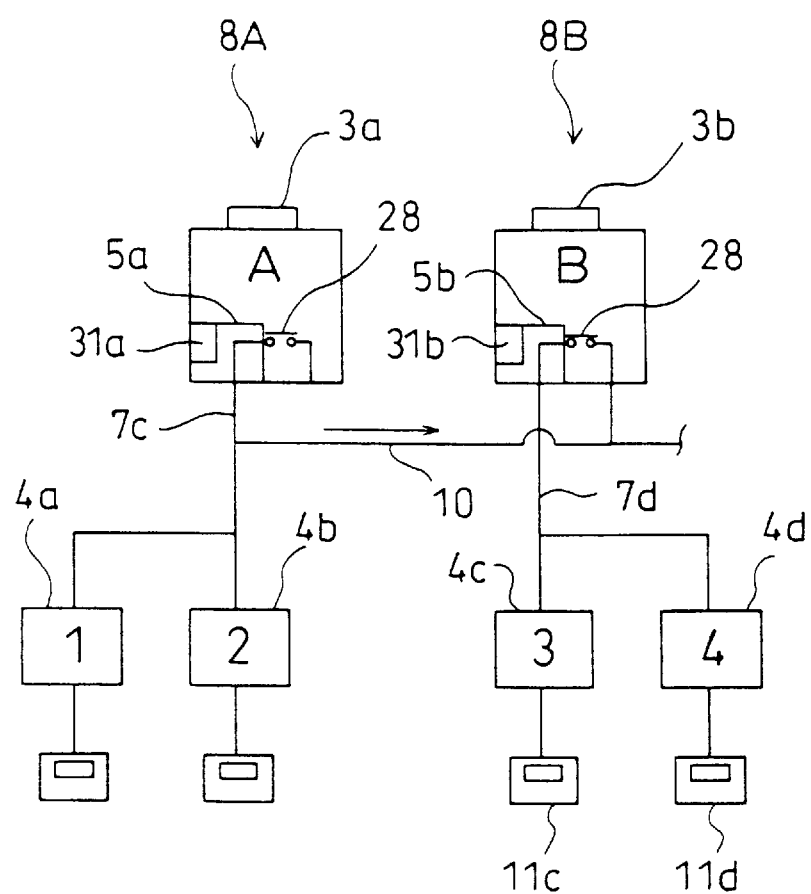
FIG. 6 is a diagram showing a system for illustration of improper interconnection detection.

More specifically, in FIG. 6, the control group (8A) having the outdoor unit (3a) of address number "A" and the control group (8B) having the outdoor unit (3b) of address number "B" are provided. The centralized communication path (10) extending from the control group (8B) is connected directly to the group communication path (7) of the control group (8A) without involving the outdoor control unit (5a). The case that the detection of this improper interconnection is made at the time of recognition of group member addresses is described.

At the time of recognition of group member addresses, each of the outdoor units (3a, 3b) transmits an address signal for control only to the indoor units (4a, 4b, 4c, 4d) of the control group (8A, 8B) to which it belongs, as mentioned above. At this time, each of the outdoor units (3a, 3b) turns the second open/close circuit (28) to the OFF position so that an address signal cannot be transmitted to the indoor control units (4a, 4b, 4c, 4d) of the other control group (8A, 8B). Except when transmitting the address signal, each of the outdoor units (3a, 3b) turns the second open/close circuit (28) to the ON position.

On the other hand, the outdoor control units (5a, 5b) include improper interconnection recognizing means (31a, 31b), respectively. The improper interconnection recognizing means (31a, 31b) are each composed so as to transmit an improper interconnection detecting signal to the indoor units (4a, 4b, 4c, 4d) connected to each other through the group communication path (7c, 7d) when receiving an address signal for control from the other control group (8A, 8B).

In the case that an address signal is transmitted from the outdoor unit (3a) of address number "A" to the indoor units (4a, 4b) of its own group under the above-mentioned improper interconnection condition, the address signal is transmitted to the outdoor unit (3b) of the other control group (8B) of address number "B" through the centralized communication path (10) beyond just to the indoor units (4a, 4b) of its own group (See the arrow of FIG. 6).

Since the outdoor unit (3b) of address number "B" transmits no signal, the second open/close circuit (28) turns ON. Accordingly, the address signal from the outdoor unit (3a) is transmitted to the indoor units (4c, 4d) having respective address numbers "3" and "4" through the outdoor control unit (5b) of the outdoor unit (3b) of address number "B".

In the present embodiment, the improper interconnection recognizing means (31b) provided in the outdoor control unit (3b) detects the reception of the address signal of the other control group (8A). The improper interconnection recognizing means (31b) recognizes the occurrence of an improper interconnection that the group communication path (7) and the centralized communication path (10) is connected directly to each other without the involvement of the outdoor control unit (5), and transmits an improper interconnection recognition code to each of the indoor units (4c, 4d) through the group communication path (7d).

Thus, under the conditions shown in FIG. 6, the improper interconnection recognition code is transmitted from the outdoor unit (3b) of address number "B" to the indoor units (4c, 4d) having respective address numbers "3" and "4", so that an improper interconnection code is indicated on the remote controllers (11c, 11d) connected to the indoor units (4c, 4d) respectively.

Effects of Improper Interconnection Detection of Embodiment 1

According to Embodiment 1, when an address signal to be transmitted and received only in each of the control groups (8A, 8B, ...) is received by the outdoor control unit (5) of any one of the other control groups (8A, 8B, ...), the outdoor control unit (5) detects an improper interconnection thereby detecting an improper interconnection with accuracy. This further increases reliability.

Embodiment 2

Figure 7:
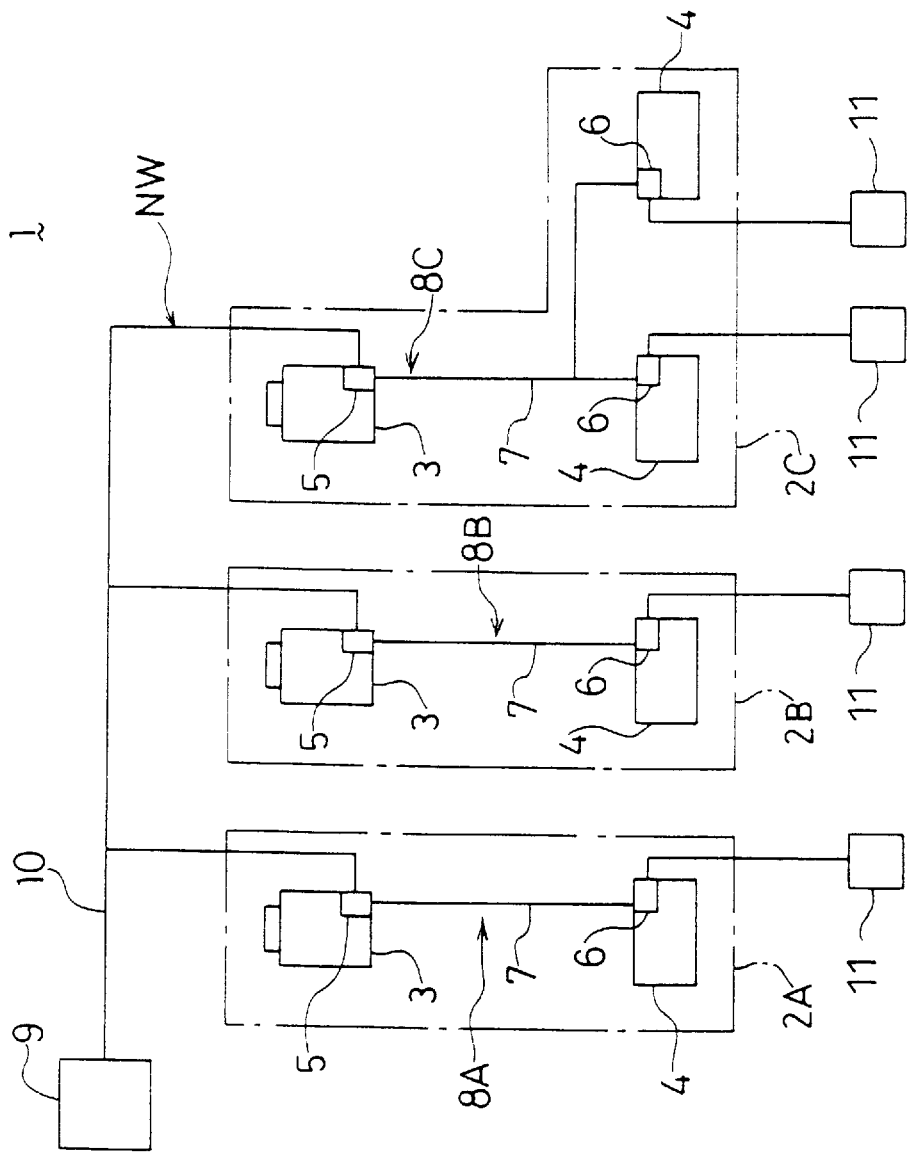
FIG. 7 is a diagram showing a signal transmission control system of an air conditioner according to Embodiment 2 of the invention.
Figure 8:
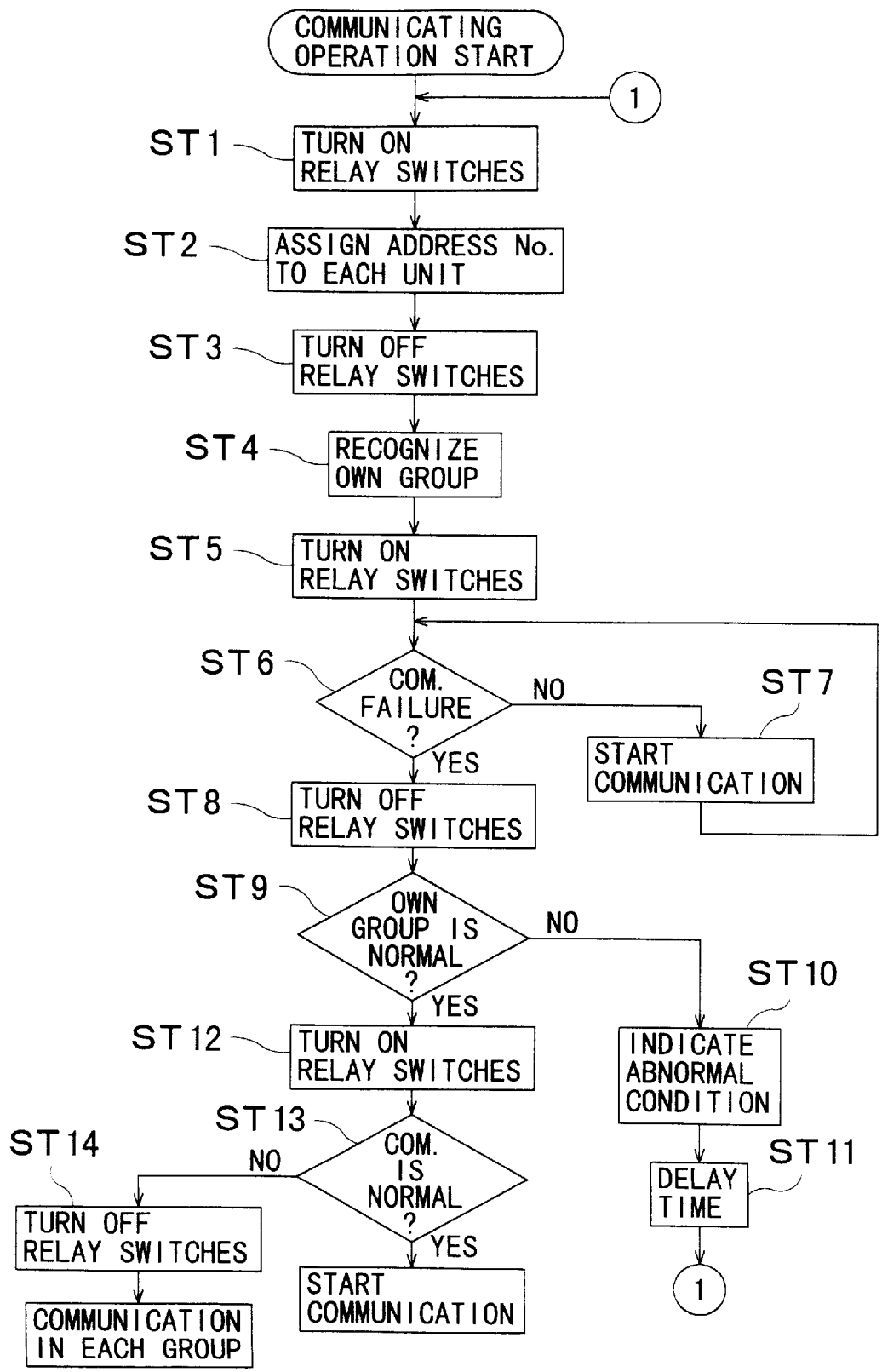
FIG. 8 is a control flow chart showing an operation at the time of communication failure.

FIGS. 7 and 8 show Embodiment 2 according to claims 5 to 9 of the present invention. FIG. 7 is a diagram of a signal transmission/reception system corresponding to FIG. 3 of Embodiment 1, but shows only three control groups (8A, 8B, 8C) for simplicity. The first control group (8A) and the second control group (8B) each have a single indoor unit (4), while the third control group (8C) has two indoor units (4, 4).

The circuit configurations of an outdoor control unit (5) and others of each control group (8A, 8B, 8C) are the same as in the circuits shown in FIG. 4.

A feature of Embodiment 2 is to provide a communication condition judging means (32) for judging both the communication conditions of the group communication path (7) and the centralized communication path (10) and a communication path break instructing means (33) for receiving an output of the communication condition judging means (32) and opening the second open/close circuit (28) in the case of occurrence of a short circuit and the like on the group communication path (7) or the centralized communication path (10).

Communicating operation

Communicating operation of the air conditioner (1) is described with reference to a control flow chart of FIG. 8.

First, when power is turned on, the relay switches (28a, 28b) of the second open/close circuit (28) of the centralized communication path (10) are turned ON in Step ST1, so that signal transmission and reception become possible between the centralized controller (9) and each of the control units (5, 6). In this state, the program proceeds to Step ST2, in which address setting is made as shown in Embodiment 1 so that address numbers are assigned to the outdoor units (3,3, ... ) and the indoor units (4,4, ... ), respectively.

Thereafter, in Step ST3, the relay switches (28a, 28b) are turned OFF so that signal transmission and reception are disabled between the centralized controller (9) and each of the control units (5, 6). In other words, the program allows signal transmission and reception only between the outdoor control unit (5) and the indoor control unit (6) through the group communication path (7).

In this state, the program proceeds to Step ST4, in which signal transmission and reception are made between the outdoor control unit (5) and the indoor control unit (6) through the group communication path (7). As described in Embodiment 1, a group member address recognizing operation is executed so that control units (5,5, ... , 6,6, ... ) are recognized in each control group (8A, 8B, 8C). In other words, the program causes each of the outdoor units (3,3, ... ) and each of the indoor units (4,4, ... ) to recognize the address number of the corresponding unit (3, 4) connected thereto through the group communication path (7). Then, the program proceeds to Step ST5, in which the relay switches (28a, 28b) are turned ON so that signal transmission and reception are enabled between the centralized controller (9) and each of the control units (5, 6) through the communication paths (7, 10).

Next, the program proceeds to Step ST6, in which detection is made about whether a communication failure occurs. In the case of NO that the communication is normal, the program proceeds to Step ST7, in which normal communication is started.

On the contrary, when the group communication path (7) or the centralized communication path (10) fails into a short circuit or the like, the program detects the occurrence of a communication failure. When a communication failure is detected, the judgment of Step ST 6 is YES and the program proceeds to Step ST8. In the step, the relay switches (28a, 28b) are turned OFF again, so that signal transmission and reception are disabled between the centralized controller (9) and each of the control units (5,5, ... , 6,6, ... ) while being enabled only between the outdoor control unit (5) and the indoor control unit (6) through the group communication path (7).

Thereafter, the program proceeds to Step ST9, in which by means of signal transmission and reception through the group communication path (7), judgment is made about whether signal transmission/reception condition in each of the control groups (8A, 8B, 8C) is normal. When communication is out of function on the group communication path (7) and the signal transmission/reception condition in the control group (8A, 8B, 8C) is abnormal, the judgment of Step ST9 is NO so that the program proceeds to Step ST10. In the step, abnormal condition is indicated by an abnormal-condition indicating lamp or the like of the indoor unit (4).

In this case, signal transmission and reception may fall into a temporary abnormal condition. In view of this, in Step ST11, time is delayed by a set time (e.g., few minutes) with the abnormal condition indicated. Thereafter, the program returns to Step ST1 and executes the above-mentioned communication starting operation. When an abnormal condition is detected again in spite of one more communicating operation, the program determines the occurrence of a communication failure such as a short circuit of the group communication path (7) and continues to indicate the abnormal condition.

On the other hand, when the signal transmission/reception condition in the control group (8A, 8B, 8C) is normal in Step ST9, the judgment is YES so that the program proceeds to Step ST12. In Step ST12, the relay switches (28a, 28b) are turned ON so that signal transmission and reception are enabled between the centralized controller (9) and each of the control units (5,5, . . . , 6,6, . . . ). Namely, in the operation of Steps ST8 to ST12, only when the signal transmission/reception condition in the control group (8A, 8B, 8C) is abnormal, the relay switches (28a, 28b) of the control group (8A, 8B, 8C) in abnormal condition remain OFF. On the contrary, when the signal transmission/reception condition in the control group (8A, 8B, 8C) is normal, the relay switches (28a, 28b) are turned back to the ON position.

Then, in Step ST13, judgment is made again about whether communication is normal. When the communication is normal, the judgment of Step ST13 is YES so that operation is switched to the normal communicating operation thereby starting operation controls to the units (3, 4). On the other hand, when a communication failure occurs, it is not a failure on the group communication path (7) but a communication failure such as a short circuit or the like on the centralized communication path (10).

At the time, the judgment in Step ST 13 is NO so that the program proceeds to Step ST14, in which all the relay switches (28a, 28b) of the control groups (8A, 8B, 8C) are turned OFF. As a result, signal transmission and reception become disabled between the centralized controller (9) and each of the control units (5, 6) but becomes enabled only between the outdoor control unit (5) and the indoor control unit (6) through the group communication path (7), so that signal transmission and reception are made only in each of the control groups (8A, 8B, 8C) thereby controlling the outdoor unit (3) and the indoor unit (4).

Under the above operation, the communication condition judging means (32) is composed of Steps ST6, ST9 and ST13, and the communication path break instructing means (33) is composed of Steps ST8, ST12 and ST14.

Other configurations and operations are the same as in Embodiment 1.

Effects of Embodiment 2

The above-mentioned control operation is sequentially executed in each of the control groups (8A, 8B, 8C). Accordingly, in the control group (8A, 8B, 8C) in which a communication failure occurs on the group communication path (7), the relay switches (28a, 28b) are turned OFF. When a communication failure occurs on the centralized communication path (10), all the relay switches (28a, 28b) of the control groups (8A, 8B, 8C) are turned OFF so that signal transmission and reception are disabled between the centralized controller (9) and the outdoor control unit (5) but are executed only in each of the control groups (8A, 8B, 8C).

As a result, communication can be maintained with the use of the normal group communication paths (7,7, . . . ) or the normal centralized communication path (10), which allows the normal control groups (8A, 8B, . . . ) to continue to be operated. Accordingly, the entire signal transmission/reception system can be avoided from being out of function and risk dispersion as commonly called can be realized. This largely insures the reliability of the signal transmission/reception system.

Other effects are the same as in Embodiment 1.

Other Embodiments

In Embodiment 1, four refrigerant circulation groups (2A, 2B, 2C, 2D) are provided, and in each refrigerant circulation group (2A, 2B, 2C, 2D), four indoor units (4) are connected to a single outdoor unit (3). However, the present invention is not limited to the configuration of Embodiment 1. For example, each refrigerant circulation group may include five or more indoor units (4) or five or more indoor units (4) may be connected to a single outdoor unit (3).

[INDUSTRIAL APPLICABILITY]

As mentioned so far, a signal transmission/reception device of an air conditioner of the present invention is suitable for large-scale air conditioning including a plurality of control groups each composed of an outdoor control unit and an indoor control unit, and particularly suitable for the case that air conditioning is managed under centralized control at a single point.

We claim:

1. A signal transmission/reception device of an air conditioner, comprising:

a plurality of control groups (8A, 8B, . . . ) in each of which a thermal-source-side control unit (5) for controlling a thermal-source-side unit (3) and a user-side control unit (6) for controlling a user-side unit (4) are connected to each other through a group communication path (7) so as to be capable of signal transmission and reception therebetween;

a centralized communication path (10) to which the thermal-source-side control units (5, 5, . . . ) are connected so that the thermal-source-side control units (5, 5, . . . ) are connected to each other to implement signal transmission and reception through the centralized communication path (10), and the respective group communication paths (7) are connected at the respective thermal-source-side control units (5, 5, . . . ) to the centralized communication path (10), thereby forming a single signal transmission/reception network (NW);

a centralized control unit (9) to which the signal transmission/reception network (nw) is connected, the centralized control unit (9) being operative for subjecting the thermal-source-side units (3, 3, . . . ) and the user-side units (4, 4, . . . ) to centralized control;

communication path interrupting means (28) being operative for bringing conduction and interruption between each of the group communication paths (7) and the centralized communication path (10);

at least a DC superposition circuit (25) which is connected to each of the group communication paths (7) so as to obtain either of conduction and interruption between the DC superposition circuit (25) and the group communication path (7), the DC superposition circuit (25) being operative for applying to the group communication paths (7) and the centralized communication path (10), a DC voltage which is used to discriminate each polarity of the group communication paths (7) and the centralized communication path (10); and a plurality of polarity discriminating circuits (22) which are respectively provided in the thermal-source-side control units (5), the user-side control units (6) and the centralized control unit (9), the polarity discriminating circuits being operative for discriminating each polarity of the group communication paths (7) and the centralized communication path (10) so that signals of the same polarity are respectively transmitted from the thermal-source-side control unit (5), the user-side control unit and the centralized control unit (9).

2. The signal transmission/reception device of an air conditioner according to claim 1, wherein the communication path interrupting means (28) is composed to execute interruption between the group communication path (7) and the centralized communication path (10) when signal transmission and reception are made only between the thermal-source-side control unit (5) and the user-side control unit (6) in the same control group (8A, 8B, . . . ).

3. A signal transmission/reception device of an air conditioner, comprising:

a plurality of control groups (8A, 8B, . . . ) in each of which a thermal-source-side control unit (5) for controlling a thermal-source-side unit (3) and a user-side control unit (6) for controlling a user-side unit (4) are connected to each other through a group communication path (7) so as to be capable of signal transmission and reception therebetween;

a centralized communication path (10) to which the thermal-source-side control units (5, 5, . . . ) are connected so that the thermal-source-side control units (5, 5, . . . ) are connected to each other to implement signal transmission and reception through the centralized communication path (10), and the respective group communication paths (7) are connected at the respective thermal-source-side control units (5, 5, . . . ) to the centralized communication path (10), thereby forming a single signal transmission/reception network (NW);

a centralized control unit (9) to which the centralized communication path (10) is connected, the centralized control unit (9) being operative for subjecting the thermal-source-side units (3, 3, . . . ) and the user-side units (4, 4, . . . ) to centralized control; and communication path interrupting means (28) being operative for bringing interruption between each of the group communication paths (7) and the centralized communication path (10) so that a signal transmission and reception can be made only between the thermal-source-side control unit (5) and the user-side control unit (6) within each control group (8A, 8B, . . . ), wherein the thermal-source-side control unit (5) includes improper interconnection recognizing means (31) for outputting an improper interconnection detecting signal to the group communication path (7) when the thermal-source-side control unit (5) and the user-side control unit (6) in each of the control groups (8A, 8B, . . . ) receive a signal to be transmitted and received only between the thermal-source-side control unit (5) and the user-side control unit (6) which both belong in any one of the other control groups (8A, 8B, . . . ), during a period in which the communication interrupting means (2B) brings interruption between each of the group communication paths (7) and the centralized communication path (10) whereby a signal transmission and reception are made only between the thermal-source-side control unit (5) and the user-side control unit (6) within each control group (8A, 8B, . . . ).

4. A signal transmission/reception device of an air conditioner comprising:

a plurality of control groups (8A, 8B, . . . ) in each of which a thermal-source-side control unit (5) for controlling a thermal-source-side unit (3) and a user side control unit (6) for controlling a user-side unit (4) are connected to each other through a group communication path (7) so as to be capable of signal transmission and reception therebetween;

a centralized communication path (10) to which the thermal-source-side control units (5, 5, . . . ) are connected so that the thermal-source-side control units (5, 5, . . . ) are connected to each other to implement signal transmission and reception through the centralized communication path (10), and the respective group communication paths (7) are connected at the respective thermal-source-side control units (5, 5, . . . ) to the centralized communication path (10), thereby forming a single signal transmission/reception network (NW);

a centralized control unit (9) to which the centralized communication path is connected, the centralized control unit (9) being operative for subjecting the thermal-source-side units (3, 3, . . . ) and the user-side units (4, 4, . . . ) to centralized control; and communication path interrupting means (28) being operative for bringing conduction and interruption between each of the group communication paths (7) and the centralized communication path (10);

communication condition judging means (32) for outputting a failure signal when at least one of the group communication paths (7) falls into a communication failure during a period in which the communication interrupting means (28) brings interruption between each of the group communication paths (7) and the centralized communication path (10) whereby a signal transmission and reception are made only between the thermal-source-side unit (5) and the user-side unit (6) within each control group (8A, 8B, . . . ), and for outputting a failure signal when any of the group communication paths (7) does not fall into a communication failure and the centralized communication path (10) falls into a communication failure, during a period in which the communication interruption means (28) brings conduction between each of the group communication paths (7) and the centralized communication path (10) whereby a signal transmission and reception are made among the control groups (8A, 8B, . . . );

and communication path break instructing means (33) for receiving an output of the communication condition judging means (32), instructing the communication path interrupting means (28), when at least one of the group communication paths (7) falls into a communication failure, to execute interruption between the group communication path (7) in communication failures and the centralized communication path (10), and instructing the communication path interrupting means (28), when the centralized communication path (10)

falls into a communication failure, to execute interruption between each of all the group communication paths (7, 7, . . . ) and the centralized communication path (10).

5. The signal transmission/reception device of an air conditioner according to any one of claims 1, 3 and 4, wherein
the communication path interrupting means (28) is composed of relays (28*a*, 28*b*).

6. The signal transmission/reception device of an air conditioner according to claim 5, wherein
the centralized communication path (10) is composed of two signal lines (10*a*, 10*b*) for transmitting signals, and
the relays (28*a*, 28*b*) are composed to execute concurrent conduction or interruption of both the signal lines (10*a*, 10*b*).

* * * * *